United States Patent [19]

Ogasawara et al.

[11] Patent Number: 5,604,539
[45] Date of Patent: Feb. 18, 1997

[54] IMAGE PROCESSING METHOD AND APPARATUS

[75] Inventors: Yoshimi Ogasawara, Yokohama; Osamu Itokawa, Akishima, both of Japan

[73] Assignee: Canon Kabushiki Kaisha, Tokyo, Japan

[21] Appl. No.: 535,387

[22] Filed: Sep. 28, 1995

Related U.S. Application Data

[62] Division of Ser. No. 108,800, Aug. 19, 1993.

[30] Foreign Application Priority Data

Aug. 21, 1992 [JP] Japan ................................. 4-222869
Aug. 26, 1992 [JP] Japan ................................. 4-227268

[51] Int. Cl.⁶ .................................................. H04N 11/04
[52] U.S. Cl. .............................................. 348/396; 348/423
[58] Field of Search .................................... 348/391, 420, 348/396, 699, 423; H04N 7/133, 11/04

[56] References Cited

U.S. PATENT DOCUMENTS

| | | | |
|---|---|---|---|
| 4,862,267 | 8/1989 | Gillard | 348/699 |
| 5,130,797 | 7/1992 | Murakami | 348/699 |
| 5,146,325 | 9/1992 | Ng | 348/384 |
| 5,170,259 | 12/1992 | Niihara | 348/415 |
| 5,253,078 | 10/1993 | Balkanski | 348/409 |
| 5,267,334 | 11/1993 | Normille | 348/401 |

FOREIGN PATENT DOCUMENTS

| | | |
|---|---|---|
| 0445727 | 9/1991 | European Pat. Off. . |
| 0482888 | 4/1992 | European Pat. Off. . |
| 2-198287 | 8/1990 | Japan . |

OTHER PUBLICATIONS

Electronique, Levy–Abegnoli, T. "compression d'image: les trois normes sont finalisees", No. 8, May 1991, Paris FR, pp. 45–47.

Patent Abstracts of Japan, vol. 14, No. 483 (E-0993), Oct. 22, 1990.

*Primary Examiner*—Howard W. Britton
*Attorney, Agent, or Firm*—Fitzpatrick, Cella, Harper & Scinto

[57] ABSTRACT

It is an object of the invention to efficiently transmit a video signal including a luminance signal and a chrominance signal. The invention includes: a first processor to extract the input luminance signal every first block which is constructed by a plurality of pixels, a second processor to extract the inputted chrominance signal every second block which is constructed by a plurality of pixels, and an encoder for encoding a predetermined macro block including the first and second blocks as a unit. Another object of the invention is to provide a movement compensating method whereby a circuit scale, a calculating time, and costs, in case of executing the movement compensation, can be reduced by using the correlation between the luminance signal and the chrominance signal. To accomplish the above object, there is provided a method of performing a movement compensation between the frames or fields, whereby a movement vector of the luminance signal is detected and the movement compensation of the luminance signal and the chrominance signal is executed on the basis of the movement vector.

14 Claims, 9 Drawing Sheets

IMAGE PROCESSING METHOD AND APPARATUS

This application is a division of application Ser. No. 08/108,800 filed Aug. 19, 1993.

BACKGROUND OF THE INVENTION

1. Field of the Invention

The present invention relates to image processing method and apparatus for transmitting a video signal, a movement image signal, or the like including a luminance component and a chrominance component.

2. Related Background Art

Hitherto, there has been known a method whereby when processing a video signal in a real-time manner, the processing system is divided into a plurality of phases and processes are executed in parallel in consideration of a processing speed.

On the other hand, generally, a luminance signal has a frequency band wider than that of a chrominance signal. For example, in an A/D converting unit, a sampling rate when converting an analog signal into a digital signal is set to a value which is twice as high as the sampling rate of the chrominance signal.

In the above conventional example, however, since the luminance signal and the chrominance signal are independently processed in parallel, for example, in a case of performing a movement compensating operation, in order to balance the contents of the video images between the luminance signal and the chrominance signal, it is necessary to match the movement information (movement vector), in the luminance signal, with that of the chrominance signal.

When the operator tries to communicate the movement information between the luminance signal and the chrominance signal for this purpose, there are drawbacks such that a scale of hardware to realize such a process is large and the processing operation is also complicated and the like.

Further, when the luminance signal and the chrominance signal are transmitted, if an uncorrectable error occurs, its correcting operation is complicated.

Hitherto, a band compression encoding in which a movement image signal is transmitted at a low bit rate is indispensable to effectively use a transmission path and to reduce the communication costs. Therefore, various kinds of band compressing methods have been examined. Among them, a movement compensation encoding method for encoding in consideration of the movement of an image is promising.

In a conventional apparatus for encoding by performing the movement compensation, however, since the luminance signal and the chrominance signal are independently processed by different circuits, there are the following problems: (1) a circuit scale is large; (2) it takes a long calculating time as a whole; and (3) the costs are high.

SUMMARY OF THE INVENTION

The invention is made in consideration of the above problems, and it is an object of the invention to efficiently transmit a video signal including, luminance component and, chrominance component.

For this purpose, it is another object of the invention to provide a method of efficiently encoding or decoding the video signal.

Further another object of the invention is to provide an encoding/decoding method which can easily correct a transmission error.

Still another object of the invention is to provide a movement compensating method whereby a scale of a movement compensation circuit can be decreased by using the correlation between the luminance signal and the chrominance signal and a movement compensating time can be also reduced.

The above and other objects and features of the present invention will become apparent from the following detailed description and the appended claims with reference to the accompanying drawings.

DETAILED DESCRIPTION OF THE PREFERRED EMBODIMENTS

The embodiments of the invention will now be described below, mainly with respect to the phase division in of processing a video signal in parallel by the multiphase division and a processing unit block construction in the phase.

Embodiment 1

Figure 1:
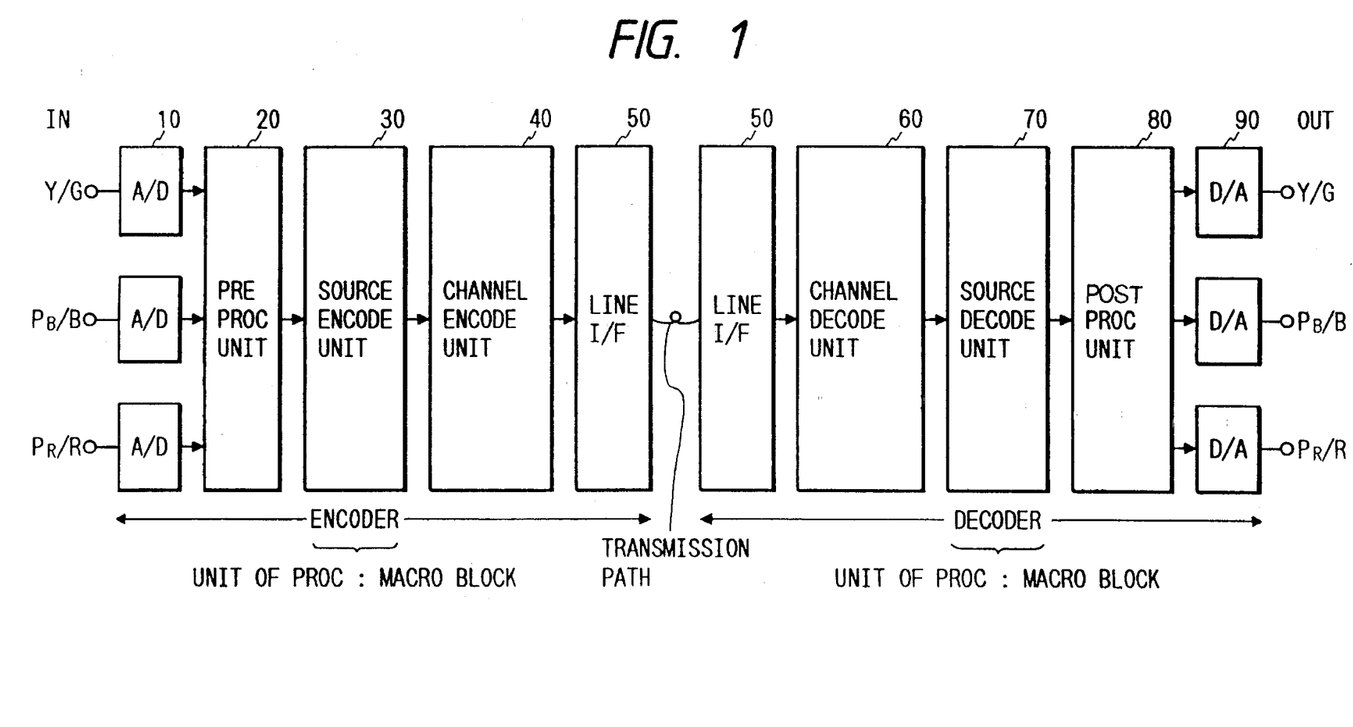
FIG. 1 is a block diagram of a first embodiment of the invention.

FIG. 1 is a block diagram showing a whole construction of the first embodiment of the invention.

In FIG. 1, reference numeral 10 denotes an A/D converter to convert a luminance signal Y/G, and chrominance signals $P_B/B$ and $P_R/R$, which were input into digital signals. A sampling frequency for the luminance signal Y/G is set to a value which is twice as high as a frequency for each of the chrominance signals $P_B/B$ and $P_R/R$ (that is, the data amount is twice as large as the data amount of the chrominance signal). Reference numeral 20 denotes a pre-processing unit. For each of the signals, the pre-processing unit 20 executes a filtering process, such as smoothing, edge emphasis, or the like and a process to rearrange data individually for each of a fundamental processing blocks for encoding. Reference numeral 30 denotes a source encode unit for compressing the data by a quantization or a variable length encoding of the data which is transmitted from the pre-processing unit 20. Reference numeral 40 denotes a channel encode unit for adding an SYNC signal to synchronize with the receiving side, a code for an error correcting process, and the like to the data encoded by the source encode unit 30, thereby constructing a data format for transmission. Reference numeral 50 denotes a line interface for modulating the data sent from the channel encode unit 40 and transmitting the modulated data to a transmission path in order to construct a format suitable for an external transmission path.

A decode unit is constructed by the line interface (I/F) 50, a channel decode unit 60, a source decode unit 70, a post-processing unit 80, and a D/A converter 90. By executing the processes opposite to the processes executed by the above encode unit, the decode unit decodes the transmitted encoded data into the same original data as that input to the encoder.

It is one of the features of the invention that a transmission processing unit in the source encode unit 30 is constructed by a macro block as will now be explained below.

In, in a signal processing block format according to the invention, a certain plurality of blocks each of which is constructed by allowing luminance and chrominance data to mixedly exist, every delimiter of an arbitrary number of data, which was transmitted and in which time bases were matched, are set to a fundamental processing unit (hereinafter, referred to as a macro block). Source encoding and decoding processes are executed, so that there is no need to perform the communication of information between the luminance signal and the chrominance signals in association with the movement compensating operation. A scale of a hardware to realize the above processes can be also simplified.

Figure 2A:
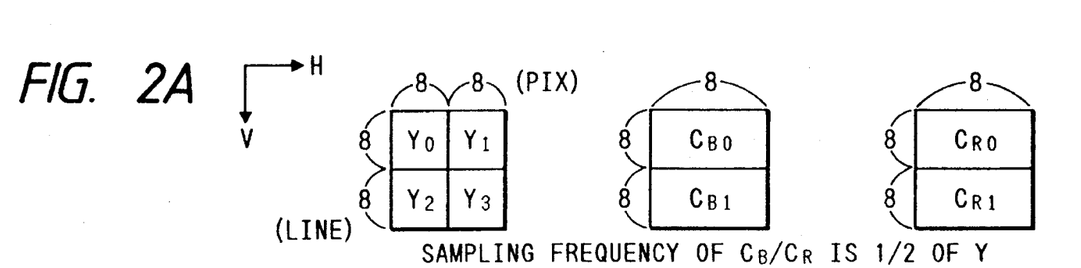
FIGS. 2A to 2C are detailed diagrams showing macro blocks.
Figure 2B:
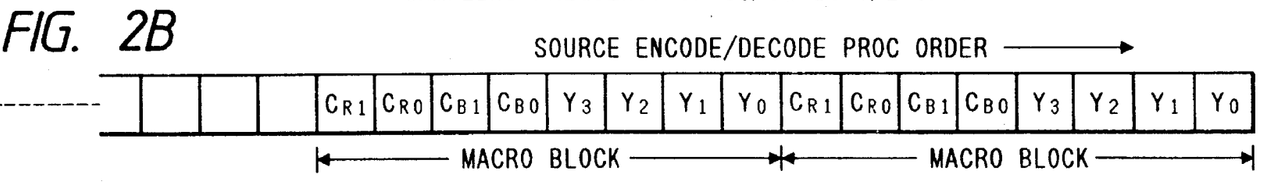
Figure 2C:
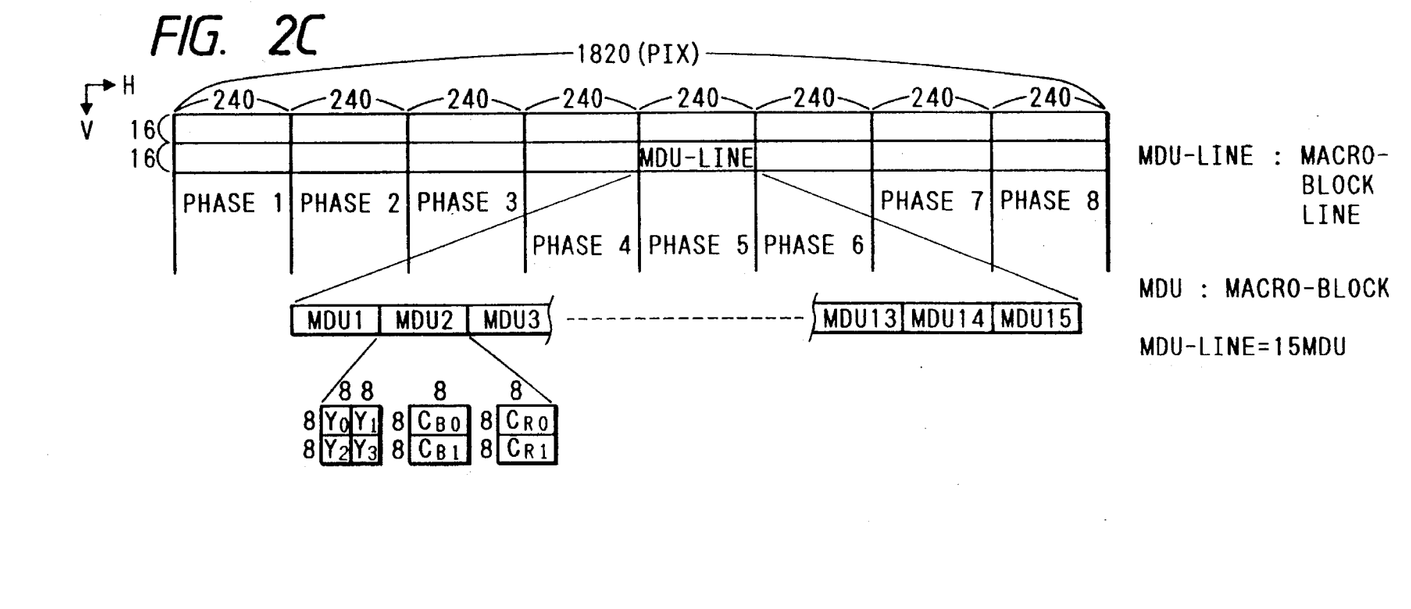

FIGS. 2A to 2C show examples of macro blocks in case of performing the source encoding process by using a DCT (discrete cosine transformation). FIG. 2A shows macro blocks in the case where a processing unit of the DCT is set to a pixel block of (8×8) pixels. Since it is now assumed that a sampling rate of the luminance signal is twice as high as that of the chrominance signal, the number of pixels in the horizontal direction (H) of the luminance signal is twice as large as that of the chrominance signal. That is, one macro block is constructed by a total of eight DCT blocks comprising four DCT blocks ($Y_0$, $Y_1$, $Y_2$, $Y_3$) of the luminance signal, and two DCT blocks ($C_{B0}$, $C_{B1}/C_{R0}$, $C_{R1}$) of each of the chrominance signals of red and blue. To enable the movement compensating process to be easily executed, the number of lines in the vertical direction (V) is set to 16 which is integer times as large as the number of DCT blocks.

FIG. 2B shows an example of a transmitting order in the case where the macro block in FIG. 2A is encoded and transmitted. In the macro block, the signals are sequentially serially encoded from the luminance signal in accordance with the order of $Y_0$, $Y_1$, $Y_2$, $Y_3$, $C_{B0}$, $C_{B1}$, $C_{R0}$, and $C_{R1}$ and are transmitted.

In the construction of the conventional example, according to the transmitting order, the luminance signal and the chrominance signal are transmitted in parallel.

In the source encode unit 30 in the invention, the luminance signal and the chrominance signal are serially processed every macro block by a common encoding circuit.

FIG. 2C shows a state in which the video signal according to the BTA-S001 standard was divided into macro block units. The diagram shows a state in which one horizontal line is divided into eight phases (phases 1 to 8) in consideration of the actual processing speed and each phase is processed in parallel. Since each phase has a data sequence construction using the macro block as a fundamental unit, each phase is referred to as a macro-block line hereinbelow.

Since the luminance signal and the chrominance signal mixedly exist in each phase, the meaning of "parallel" differs from that in the conventional example.

A developing state of FIG. 2C will now be described. In the embodiment, since the video signal conforms with the BTA-S001 standard, each item has been standardized as follows.

Sampling frequency: luminance . . . 74.25 MHz
Color . . . 37.125 MHz
The number of horizontal effective pixels:
  luminance . . . 1920 pixels
Color . . . 960 pixels
The number of quantization bits: 8 bits Therefore, when one horizontal line is divided into eight phases, one phase, namely, one macro-block line is constructed as follows: namely, the luminance 1920/8=240 pixels and the color (960/8)×2 (red, blue)=240 pixels.

Since the total number of pixels of one macro-block line in the vertical direction (V) is equal to 16 due to this, $$240_{PIX} \times 16_{lines} \times 2 \text{ (luminance, color)} = 7680 \text{ pixels} \quad (1)$$

The total number of pixels of the macro block is as follows from FIG. 2A.

$$8_{PIX} \times 8_{lines} \times 8 \ (Y_0 - Y_3, C_{B0} - C_{B1}, C_{R0} - C_{R1}) = 512 \text{ pixels} \quad (2)$$

From the relation between the above equations (1) and (2), $$7680/512 = 15 \quad (3)$$

That is, from the equation (3), the following relation is derived.

One macro-block line=15 macro blocks

In FIGS. 2A to 2C, since the macro-block lines having the relation as mentioned above are transmitted in parallel by eight phases, a processing block speed per one phase is equal to 18.5625 MHz and has an actual numerical value.

Figure 3:
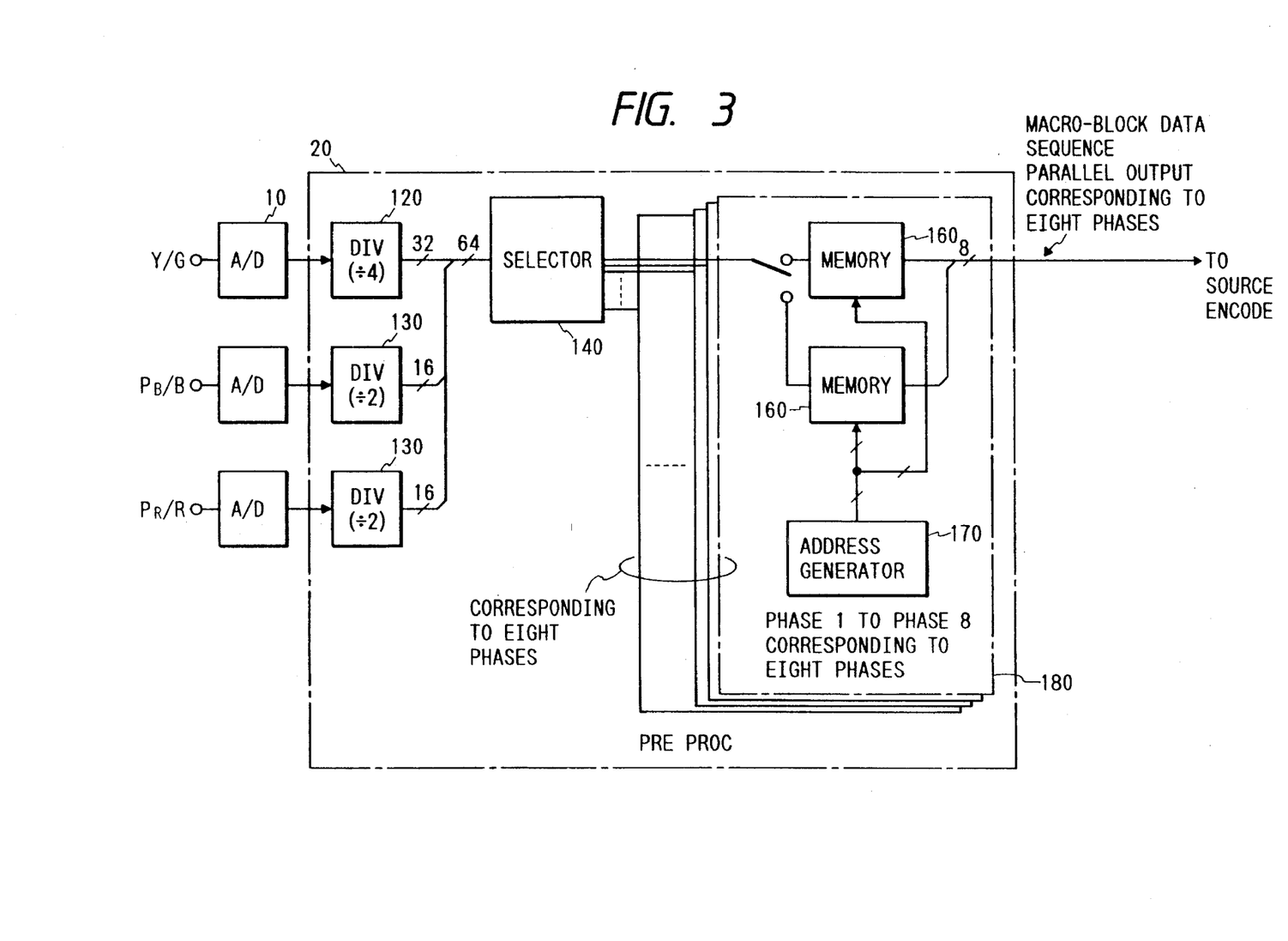
FIG. 3 is a block diagram for realizing the formation of macro blocks.

FIG. 3 shows the details of a block to produce the macro block in FIG. 2. This block is located in the pre-processing unit 20 in FIG. 1. The operation will now be briefly explained. It is now assumed that the digital signal which was A/D converted by the A/D converter 10 is set to a time sequential signal of total eight phases comprising four phases for the luminance signal in which the time base was expanded to ¼ by a DIV120 and two phases of each of the chrominance signals of red and blue in which the time base was expanded into ½ by a DIV130 in consideration of the processing speed.

Namely, with respect to each of the signals Y/G, $P_B$/B and $P_R$/R, the signal of eight bits is output from the A/D converter 10 every pixel. In the DIV120, the luminance signal is frequency divided into ¼ so as to form the macro block in FIG. 2A. Thus, the data of 8 bits×4 phases (=32 bits) per one macro block is output in parallel. On the other hand, in the DIV130, by frequency dividing the chrominance signal into ½, the data of 8 bits×2 phases (=16 bits) is output in parallel with respect to each of the signals $P_B$/B and $P_R$/R. The parallel data of total 64 bits is distributed to each of the above-mentioned Phase 1 to Phase 8 by a selector 140. Reference numeral 180 denotes an address converting unit for rearranging the order in the macro block. The address converting unit 180 is constructed by two memories 160 and an address generator 170. The memories 160 are used as double buffers. The address converting unit 180 is provided for each of the eight phases of Phase 1 to Phase 8. A processing speed of each phase when the data was developed into eight phases is equal to 18.5625 MHz from the relation of the sampling frequencies of the luminance signal and the chrominance signal.

In the address converting unit 180, the memories 160 have a construction of two banks and the writing and reading operations are alternately executed. The data is extracted by an address generator 170 on a macro block unit basis of every 8×8 (=64 pixels) blocks.

The selector 140 divides one picture plane into eight regions in the horizontal direction as shown in FIG. 2C and selectively sends the image data which is sequentially input in the horizontal direction to the address converting unit of the phase corresponding to each of the eight regions.

The operation of the selector 140 is controlled by an address signal indicative of the address on one picture plane which is generated from a circuit (not shown).

Although each of the phases has been set to 240 pixels in the horizontal direction in the embodiment, each phase can be also set to an arbitrary number of pixels by the control of the selector 140.

A data sequence which is output from the address converting unit 180 is as shown in FIG. 2B. After that, the source encode unit 30 and the channel encode unit 40 are provided in parallel with respect to eight phases.

Figure 4:
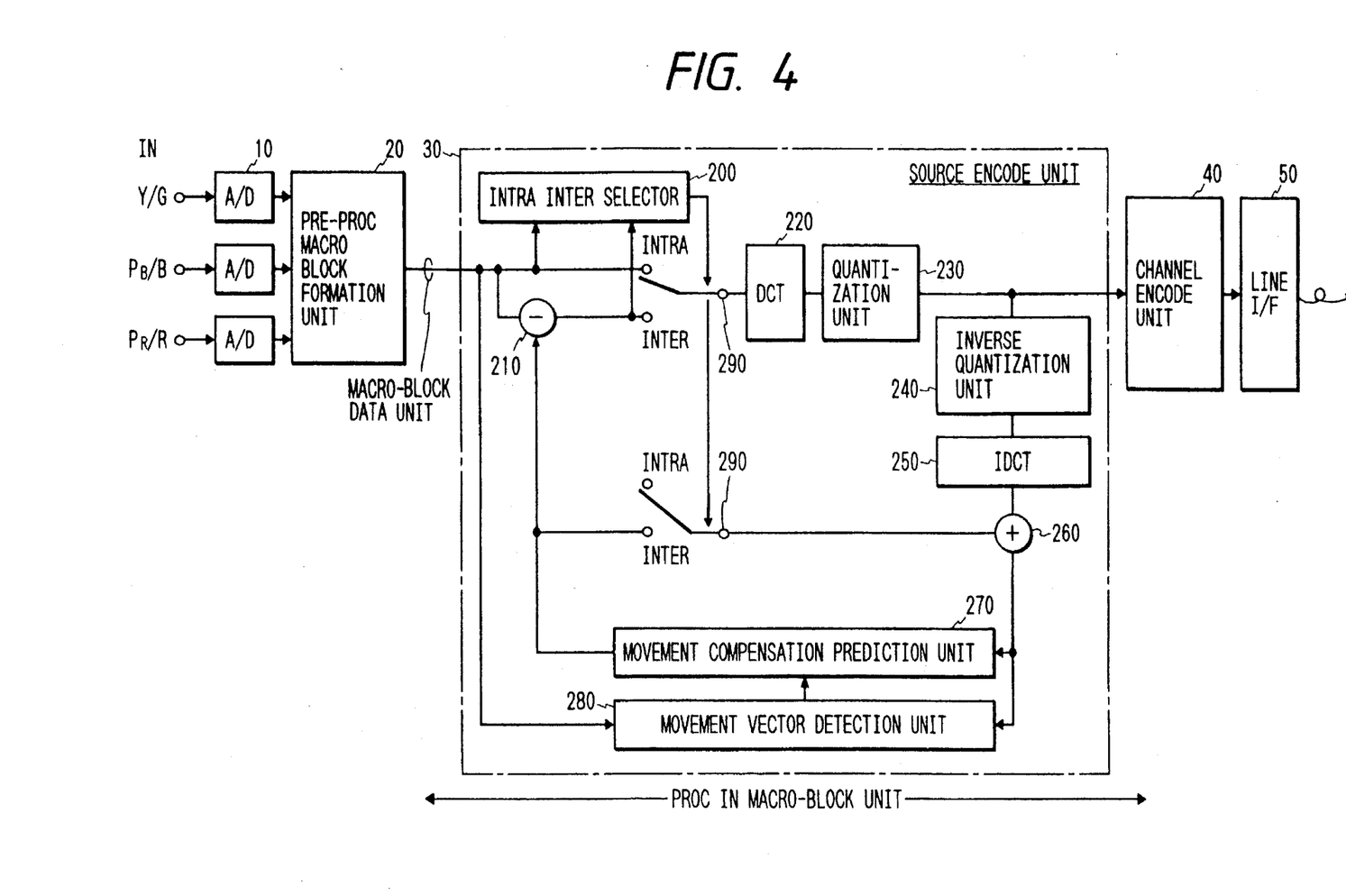
FIG. 4 is a detailed block diagram in case of performing the movement compensating operation by a source encoding in FIG. 1.

FIG. 4 is a detailed block diagram in a case where the movement compensation predicting operation is executed in the source encode unit 30 of the CODER section in FIG. 1. For simplicity of explanation, the source encode unit 30 of one certain phase will now be described as an example. The operation will now be briefly explained. The operating mode is mainly classified into two modes of INTRA (operation in a field or a frame: namely, intra-frame operation) and INTER (operation between fields or frames: namely, inter-frame operation). In the INTER mode, the encoding process is executed to the difference value between the input data and the prediction value which is calculated from the past data and the input data. In the INTRA mode, the encoding process is executed to the input data itself. Each of the above two modes is adaptively selected on the basis of the result of comparison between the input data and the difference value between the input data and prediction value. Such a selecting operation is executed by an INTRA/INTER selector 200. In the general operation, electric power components of those data are calculated, either smaller one of the data sequences is selected, and a switch 290 is switched. The movement compensation predicting operation is executed in the INTER mode. The INTRA mode will be first explained. When the INTRA mode is selected by the selector 200, the switch 290 is switched to the INTRA side. The digital signal sequence which was subjected to the macro block forming process in the pre-processing unit 20 is supplied to a DCT unit (orthogonal transformation unit) 220, by which the time-sequential data is converted into the coefficient value indicative of the distribution of the frequency region. A quantization unit 230 produces the compressed digital data sequence and sends to an inverse quantization unit 240 and the channel encode unit. In the INTER mode, on the other hand, when the INTRA mode is selected by the selector 200, the switch 290 is switched to the INTER side. The inverse quantization unit 240 and an IDCT unit 250 produce the digital data (difference value) of the original time sequence. This digital data is added by an adder 260 to the past prediction value which is the past value with respect to the time and has already been formed. From the locally decoded data and the data which was newly input, the movement component of the video signal which was newly input is detected as a vector by a movement vector detection unit 280. On the basis of this vector, a movement vector detection unit 270 calculates a prediction value. A subtracter 210 calculates a difference between the prediction value and the data which was newly input. The difference is sent to the DCT unit 220. After that, the compressed digital data sequence is produced by the operations similar to those in the INTRA mode and is sent to the inverse quantization unit 240 and the channel encode unit.

The DCT unit 220 for performing the orthogonal transformation executes the discrete cosine transformation every (8×8) pixel blocks. The IDCT unit 250 execute the inverse discrete cosine transformation. The quantization unit 230 coarsely quantizes, particularly, the high frequency component, every (8×8) blocks by using a predetermined quantization matrix. The inverse quantization unit 240 executes the inverse quantization by using the coefficients of the same quantization matrix as that mentioned above.

As will be understood from the above description, since the operation to calculate the prediction value and the operation to calculate the difference value in the movement compensating operation in the INTER mode of the source encode unit can be executed irrespective of the luminance signal and the chrominance signal since the above macro block is used as input data, the scale of hardware can be remarkably simplified.

Although the invention has been described with respect to the case of the CODEC apparatus as an example, the invention is not limited to such a case but can be widely applied to other apparatuses such as a digital VTR or the like so long as it executes the digital compression signal processing operation.

The construction of the macro blocks and the bit unit have been shown as an example in FIG. 2 and the invention is not limited to them.

As described above, by using the macro block construction as in the above embodiment of the invention, even in the case where the hardware scale is large and complicated as in the movement compensating operation, the luminance signal and the chrominance signal can be simultaneously handled. Therefore, a complicated operation, such as matching the operations between the luminance signal and the chrominance signal, is eliminated. The hardware scale can be also reduced. Data can be easily handled. The costs of the system can be also fairly reduced.

Embodiment 2

The second embodiment of the invention will now be described with reference to FIG. 5. The second embodiment by further adds a construction of the variable length encoding, error correction, and the like, to the construction of the first embodiment described above.

According to the second embodiment, since it uses the above macro-block format, even when an error correction is executed, the error can be easily corrected on a macro block unit basis.

Figure 5:
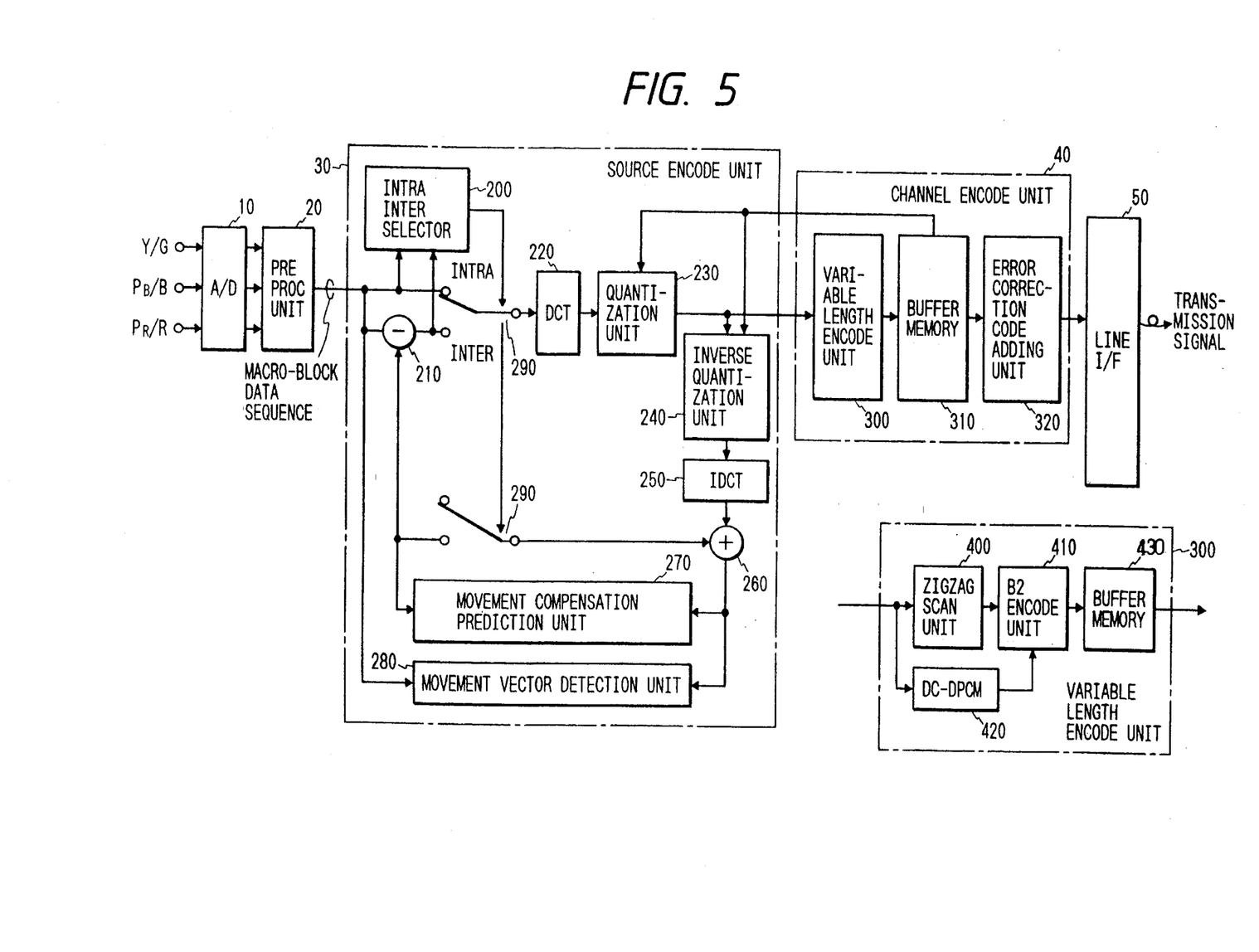
FIG. 5 is a block diagram of a second embodiment.
Figure 6:
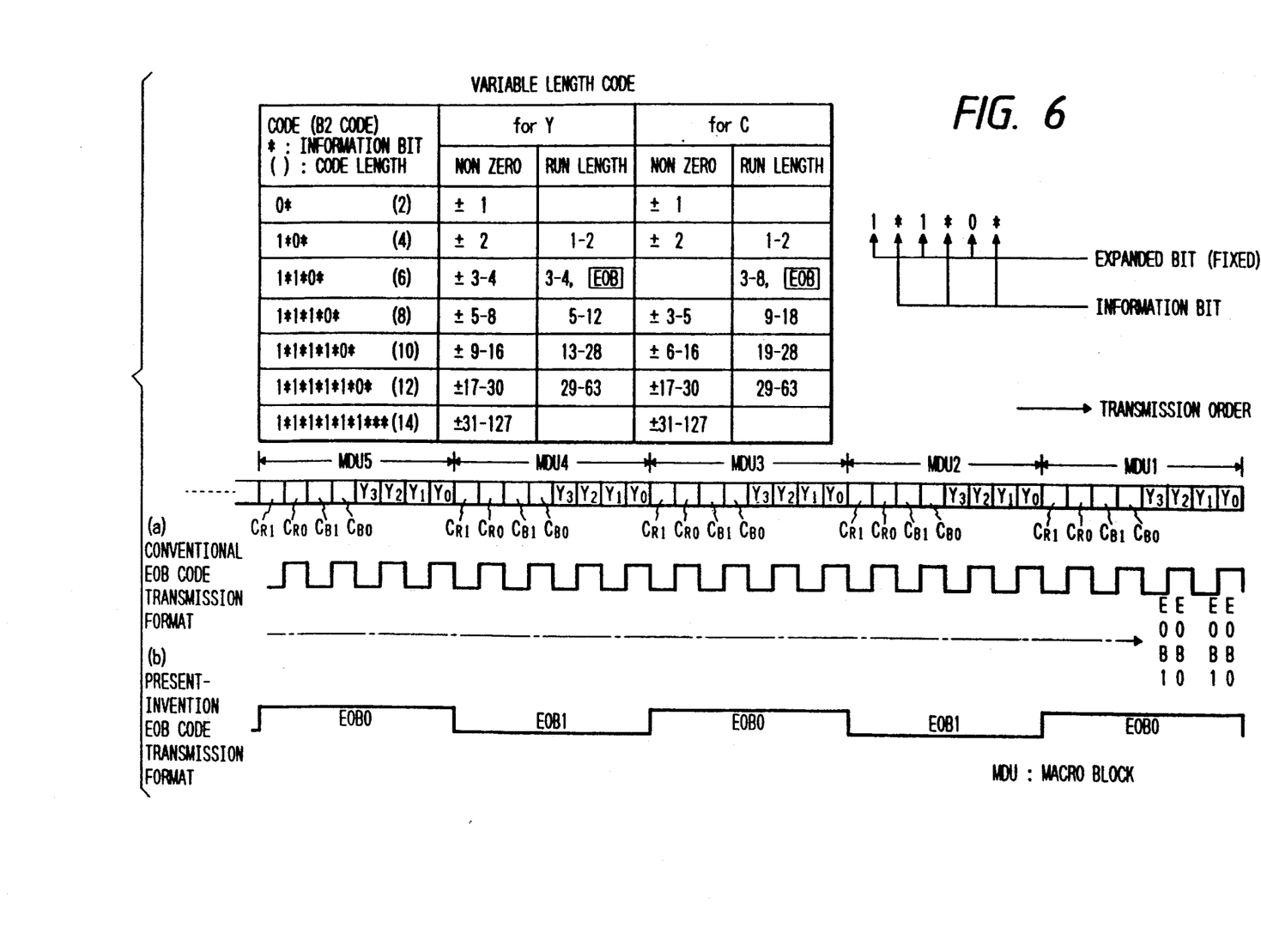
FIG. 6 is a diagram showing a variable length encoding method.

FIG. 5 shows a detailed block diagram of the channel encode unit 40. The operation will be briefly explained. The data compressed by the source encode unit is further subjected to a variable length encoding process according to a generation probability of data by a variable length encode unit 300 in the channel encode unit 40 in order to more efficiently reduce a bit rate. In a buffer memory 310 at the next stage, quantizing steps of the quantization unit 230 and the inverse quantization unit 240, in the source encode unit 30, are controlled by an occupation amount in the buffer memory 310 so that a rate of data which is transmitted is adapted to a bit rate of the transmission path. Further, as a countermeasure for protection in the case where an erroneous propagation occurs on the transmission path, an error correction code is added by an error correction code adding unit 320. Further, a detailed block in the variable length encode unit 300 is shown. Different from the two-dimensional Huffman code or the like in which the run length and the non-zero coefficient are combined which has already been standardized in MPEG, H.261, or the like, the variable length encoding shown in the above relates to the case of a one-dimensional B2 code which mainly intends to simplify the hardware and is a candidate of the recommendation 723. The operation will now be briefly explained. First, the DCT blocks (8×8=64 blocks in case of the example of the blocks in FIGS. 2A to 2C), which were discrete cosine transformed by the source encode unit 30, construct a matrix indicative of a distribution of the frequency components. Since a probability such that the levels of the frequency DC components are uniformly distributed is high, even when the variable length encoding process is applied, the reduction of the bit rate cannot be expected. Therefore, a DPCM process is executed in a DC-DPCM 420. On the other hand, since the frequency AC components have a Laplacian distribution as a probability, data is sequentially read out by a zigzag scan unit 400 in accordance with the order from a high generation probability and is variable length encoded by a B2 encode unit 410. In a buffer memory 430 at the next stage, the data which is generated with variable lengths is divided into data of an arbitrary data length. The divided data is sent to the next stage. For this purpose, the above frequency AC components are necessary. FIG. 6 shows the case where as an example of the B2 code, the maximum code length is set to 14 bits, the maximum value of the AC components lies within a range from −127 to 127 and the maximum value of the run lengths is set to 63. As shown in FIG. 6, it will be understood that two bits of an expansion code and an information code construct one pair in the B2 code and the code length is expanded every two bits. Further, in the general B2 code, an EOB (End of Block) code is toggled on a DCT block unit basis every DCT block as shown in a transmission format (a) in FIG. 6 and added, and so long as the EOB code is correctly received on the receiving side, the error is not propagated to the next DCT block.

However, since it is assumed that the data is processed on a macro block unit basis as shown in the invention, the embodiment is characterized in that the EOB code is toggled and added on a macro block unit basis as shown in a transmission format (b) in FIG. 6.

Figure 7:
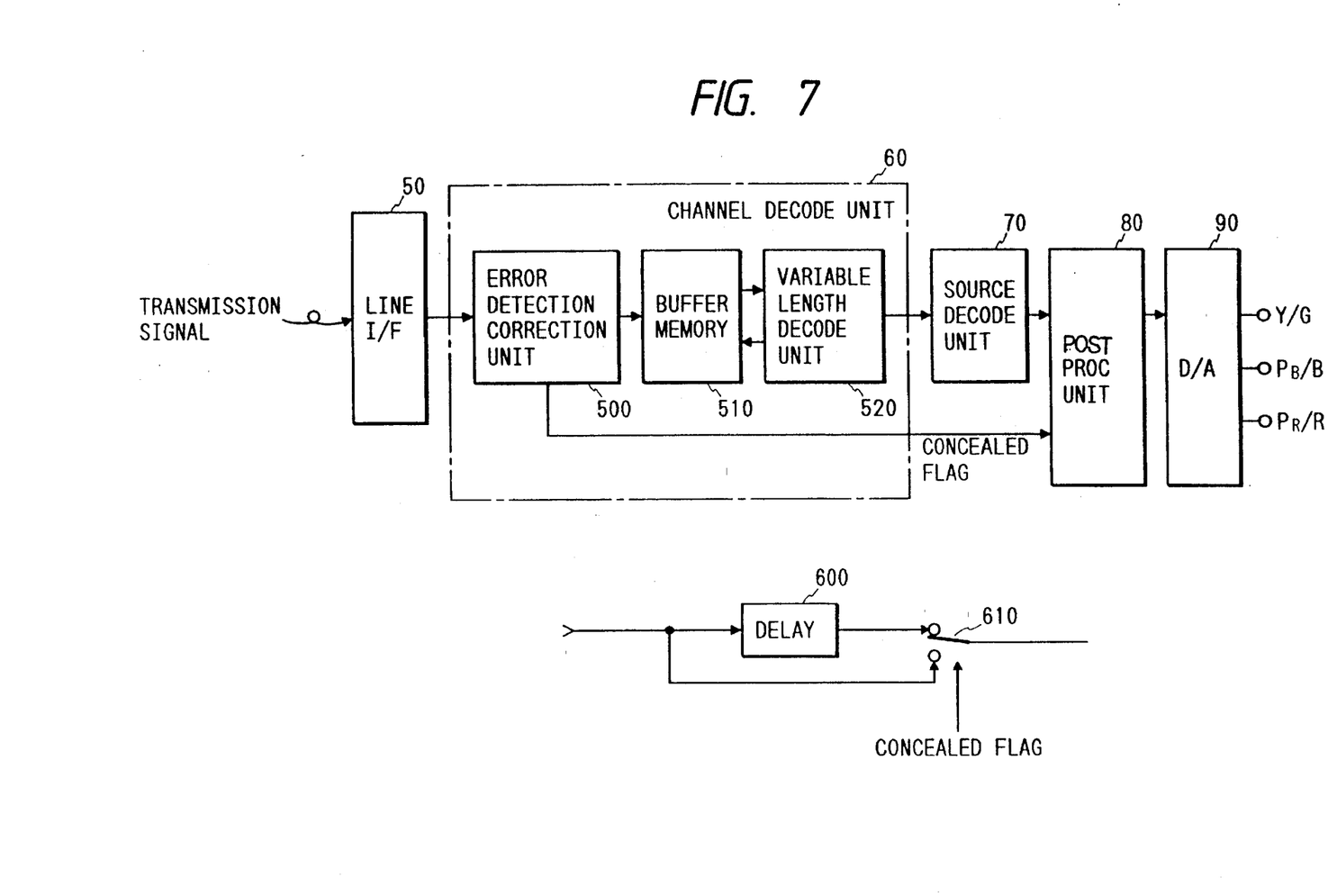
FIG. 7 is a diagram showing a construction of an apparatus on the receiving side.

FIG. 7 shows a detailed block diagram mainly with respect to a channel decoding on the DECODER side. In the diagram, an error in the reception data, which was input through the line interface 50, is detected and corrected by an error detection correction unit 500 in the channel decode unit 60. If there is an uncorrectable error, a concealed flag indicative of the meaning of the correction is sent to the post stage. A correcting operation is executed by a method of replacing the error data to the preceding data or the like for only a period of time during which the concealed flag exists. In FIG. 7, it is assumed that a switch 610 is controlled by the concealed flag and, upon correction, the switch 610 operates so as to select the output data from a delay 600.

A buffer memory 510 and a variable length decode unit 520 execute a variable length decoding opposite to the encoding which was executed in the channel encode unit. The decoded data is sent to the source decode unit 70.

Although the embodiment has been described with respect to the case of the CODEC apparatus as an example, the invention is not limited to such an example, it will be obviously understood that the invention can be also widely applied to other apparatuses such as digital VTR and the like so long as it executes the digital compression signal processing operation.

The construction (Y: 4 DCT blocks, CB: 2 DCT blocks, CR: 2 DCT blocks) of the macro block shown in FIGS. 2A to 2C and the bit unit have been shown as an example. The invention is not particularly limited to such an example.

As described above, by using the macro block construction as shown in the invention, even in the case where a hardware is large in scale and is complicated as in the movement compensating operation, the luminance signal and the chrominance signal can be simultaneously handled. Therefore, a troublesomeness such that the operations are matched between the luminance signal and the chrominance signal or the like is eliminated. The hardware scale can be also reduced. The hardware can be easily handled. The system costs can be also remarkably reduced.

Further, since the EOB code has been toggled on a macro block unit basis, it is possible to easily match the hardware with the system for executing the source encoding and decoding processes on a macro block unit basis as in the invention. By monitoring the toggling operation of the EOB code, the errors can be easily corrected on a macro block unit basis.

Since a plurality of same EOB codes are transmitted on a macro block unit basis, even when a few EOB codes in the macro block are wrong due to errors, so long as several correct EOB codes have been transmitted, the macro block can be detected. Consequently, the errors are not propagated to the next macro block.

That is, the invention is strong for errors as compared with the conventional case where the EOB code is toggled and transmitted on a DCT block unit basis.

According to the first and second embodiments of the invention as described above, the video signal including the luminance component and the chrominance component, can be efficiently transmitted.

A method of efficiently encoding and decoding the video signal can be provided.

Further, an encoding/decoding method which can easily correct a transmission error can be provided.

Embodiment 3

A movement compensation encoding apparatus according to the third embodiment will now be described.

Figure 8:
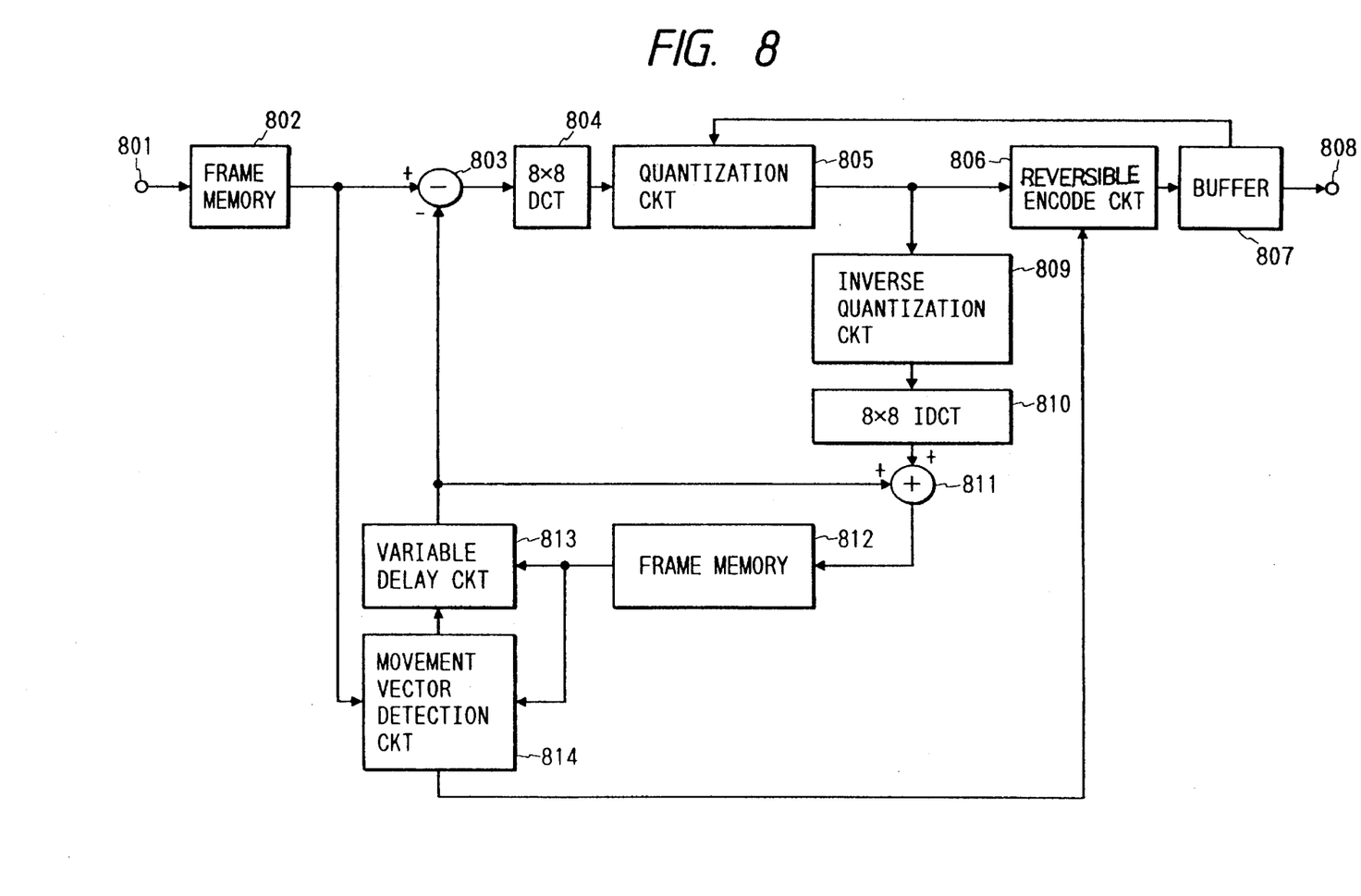
FIG. 8 is a block diagram of an encoding apparatus according to an a third embodiment of the invention.

In FIG. 8, the luminance signal and the color difference signals are input from an input terminal 801 and are respectively subjected to processes, which will be explained hereinbelow, and the processed signals are output from an output terminal 808.

Explanation will now be made with respect to the luminance signal (hereinafter, referred to as a data signal) as an example.

The luminance signal input from the input terminal 801 is once stored in a frame memory 802. Block data of total 64 pixels (8 pixels in the horizontal direction×8 pixels in the vertical direction) is read out from the frame memory 802 and is processed on a block unit basis.

A data signal corresponding to the preceding image data is read out from a frame memory 812 in which the image data of the preceding frame has been written. The data signal is supplied to a variable delay circuit 813 and a movement vector detection circuit 814.

The movement vector detection circuit 814 obtains a movement vector signal by, for example, a pattern matching method from the data signal and the input signal of the present frame and supplies to the variable delay circuit 813. Explaining further in detail, in the movement vector detection circuit 814, a macro block corresponding to a large block which is formed by a set of a few block units each comprising (8×8) pixels which are supplied from the frame memory 812 is specified. A movement compensation is executed on such a macro block unit basis.

On the other hand, the variable delay circuit 813 delays the data signal supplied from the frame memory 812 by only the time which is set on the basis of the movement vector signal and supplies the delayed signal to a subtracting circuit 803 and an adding circuit 811. For instance, it is also possible to construct in a manner such that the variable delay circuit 813 has a memory to store the color difference signals ($P_B$, $P_R$) and the luminance signal and the write and read addresses in the memory are controlled and supplied to the subtracting circuit 803 and the adding circuit 811.

The subtracting circuit 803 subtracts the data signal of the preceding frame supplied from the variable delay circuit 813 from the input signal of the present frame and supplies a prediction error signal as a resultant subtraction signal to a discrete cosine transforming circuit (hereinafter, referred to as a DCT) 804. The DCT 804 cosine transforms the prediction error signal in the horizontal and vertical directions, thereby obtaining a matrix of (8×8) DCT coefficients, namely, a spatial frequency.

The transformed coefficients are quantized by a quantization circuit 805. The quantized spatial frequency coefficient train is supplied to an inverse quantization circuit 809 and is inversely quantized. The inversely quantized spatial frequency coefficient train is inversely transformed into the spatial frequency train of (8×8) by an inverse discrete cosine transforming circuit (hereinafter, referred to as an IDCT) 810.

The inversely transformed output signal from the IDCT 810 is sent to the adding circuit 811.

The adding circuit 811 adds the data signal supplied from the variable delay circuit 813 and the inversely transformed output signal supplied from the IDCT 811 and supplies the resultant addition signal to the frame memory 812. The addition signal is written into the frame memory 812 as new image data of the preceding frame.

The quantization signal and the movement vector signal are encoded by a reversible encode circuit 806.

Since the encoded data amount is changed by the image signal as mentioned above, by feeding back the signal in accordance with the amount of data accumulated in a buffer 807 by a method such that when the data amount is larger than a predetermined value, a quantization step in the quantization circuit 805 is increased or the like, the data amount is controlled to a predetermined amount.

The chrominance signal is also processed in a manner similar to the luminance signal.

Figure 9:
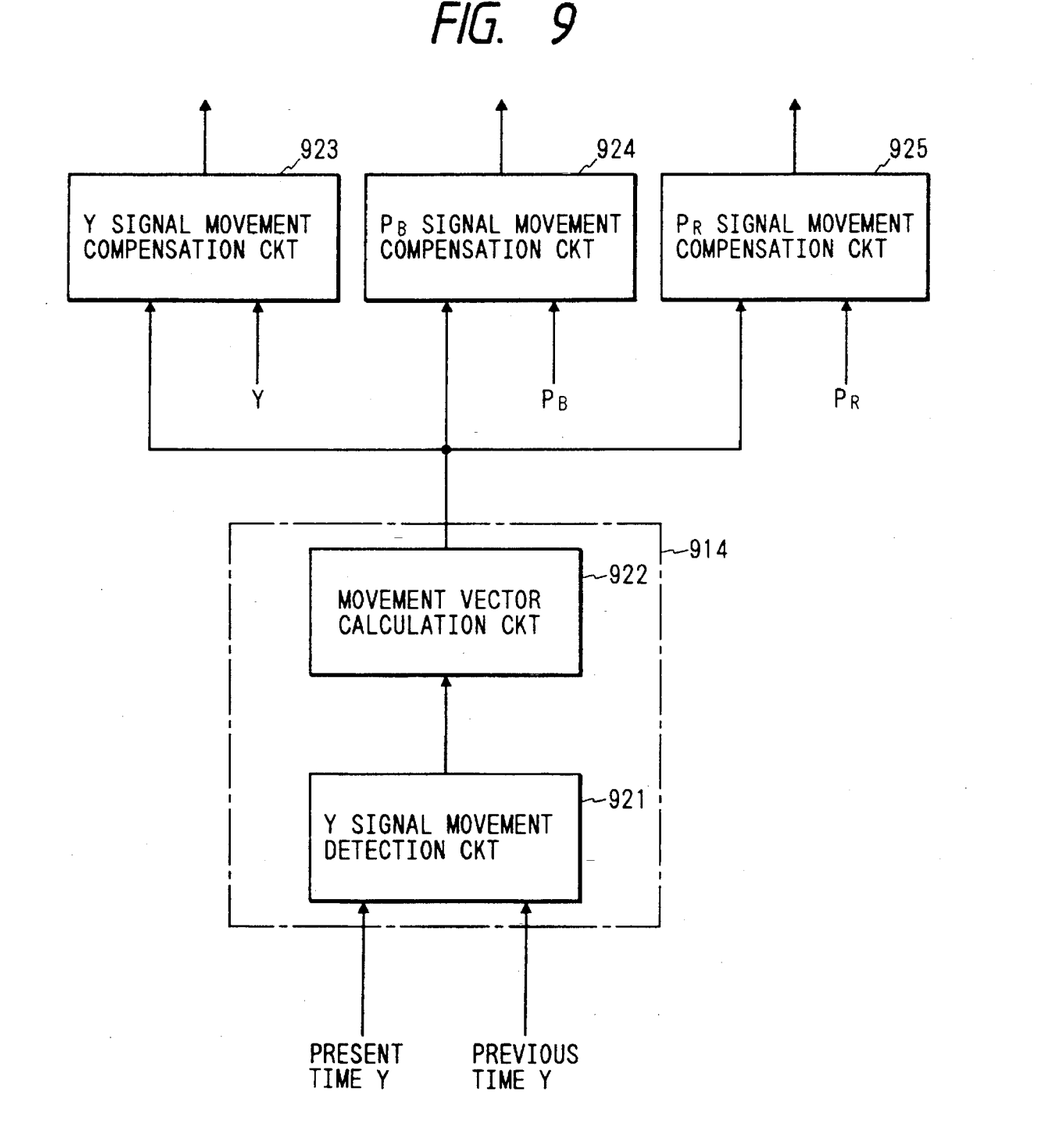
FIG. 9 is a specific block diagram of a movement compensating process according to the embodiment 3.

A specific process of the movement compensation will now be described with reference to FIG. 9.

First, the Y signal of the present frame constructed as a block and the Y signal of a plurality of blocks of the preceding frame are supplied to a movement detection circuit 921 of the luminance signal (Y signal). The movement detection circuit 921 compares the two Y signals supplied and detects the block of the preceding frame having the highest correlation with the block-formed Y signal of the present frame and supplies the result to a movement vector calculation circuit 922, by which a movement vector is calculated.

The calculated movement vector is supplied to a movement compensation circuit 923 of the Y signal, a movement compensation circuit 924 of the color difference signal $P_B$, and a movement compensation circuit 925 of the color difference signal $P_R$, by which the movement compensation is executed for the Y signal and the $P_B$ and $P_R$ signals.

The $P_B$ and $P_R$ signals are formed by increasing the color difference signals B−Y and R−Y by $1/1.826$ and $1/1.576$ times, respectively.

Namely, in the third embodiment, since there is a strong correlation between the luminance signal and the chrominance signal, a fact that the value of the movement vector of the luminance signal is equal to the value of the movement vector of the chrominance singal in many cases is used.

Although the movement compensation of the third embodiment has been performed between the frames, the third embodiment can be also applied to the case of executing the movement compensation between the fields.

According to the movement compensation processing method of the three embodiments as described above, by executing the movement compensation of the chrominance signal by using the movement vector signal of the luminance signal, there are advantages such that the scale of the movement vector detection circuit can be reduced and the total calculating time to perform the movement compensation can be reduced and, further, the costs can be decreased.

The movement compensating method of the embodiment can be applied to the movement vector detection unit 280 and the movement compensation prediction unit 270 in the above first and second embodiments.

Namely, the luminance component included in the macro block in the first and second embodiments is extracted at a predetermined timing and supplied to the Y signal movement detection circuit 921 and outputs from the movement compensation circuits 923, 924, and 925 are used for the operation in the movement compensation prediction unit 270.

The present invention is not limited to the foregoing embodiments but many modifications and variations are possible within the spirit and scope of the appended claims of the invention.

What is claimed is:

1. An image processing apparatus comprising:

(a) input means for inputting image data;

(b) dividing means for dividing an image represented by the image data into a plurality of first blocks; and (c) encoding means for encoding the image data in units of the first blocks, wherein said encoding means toggle an EOB code every second block constructed by a plurality of the first blocks and transmit the toggled EOB code.

2. An apparatus according to claim 1, further comprising means for detecting errors by using the EOB code.

3. An apparatus according to claim 1, further comprising means for detecting the second blocks by using the EOB code.

4. An apparatus according to claim 1, wherein said encoding means includes orthogonal transform means for orthogonally transforming the image data of the first blocks.

5. An apparatus according to claim 1, further comprising detecting means for detecting a movement vector and compensating means for performing a movement compensation in accordance with the result of the detection by said detecting means.

6. An apparatus according to claim 5, wherein the image data includes a luminance component and a chrominance component, wherein said detecting means detects the movement vector on the basis of the luminance component of the image data.

7. An image processing apparatus comprising:
(a) input means for inputting image data;
(b) dividing means for dividing the image data input by said input means into a plurality of first blocks; and
(c) a plurality of encoding means for encoding the image data for each first block divided by said dividing means, wherein each of said encoding means divides the image data in the first block into a plurality of second blocks and encodes the image data in the units of the second blocks and toggles an EOB code every third block constructed by a plurality of the second blocks and transmits the toggled EOB code.

8. An apparatus according to claim 7, further comprising means for detecting errors by using the EOB code.

9. An apparatus according to claim 7, further comprising means for detecting the third blocks by using the EOB code.

10. An apparatus according to claim 7, wherein said encoding means includes orthogonal transform means for orthogonally transforming the image data of the second blocks.

11. An apparatus according to claim 7, further comprising detecting means for detecting a movement vector and compensating means for performing a movement compensation in accordance with the result of the detection by said detecting means.

12. An apparatus according to claim 11, wherein the image data includes a luminance component and a chrominance component, wherein said detecting means detects the movement vector on the basis of the luminance component of the image data.

13. An image processing apparatus comprising:
a) input means for inputting digital color image data having luminance component data and chrominance component data;
b) dividing means for dividing the digital color image data into a plurality of first blocks, in the first block the luminance component data and the chrominance component data being mixed with each other at a predetermined ration corresponding to a ratio of sampling rates of the luminance component data and the chrominance component data; and
c) encoding means for encoding the color image data in units of the first blocks,
wherein said encoding means detects image movement in the first block on the basis of the luminance component data, and movement compensation encodes the color image data of the first block in accordance with the result of the detection by said encoding means.

14. An apparatus according to claim 13, wherein said encoding means performs the encoding for each color component.

* * * * *

UNITED STATES PATENT AND TRADEMARK OFFICE
CERTIFICATE OF CORRECTION

PATENT NO. : 5,604,539

DATED : February 18, 1997

INVENTORS : YOSHIMI OGASAWARA ET AL.

It is certified that error appears in the above-identified patent and that said Letters Patent is hereby corrected as shown below:

ON THE TITLE PAGE

[57] Abstract
      Line 3, "includes:" should read --includes--;
      Line 6  "inputted" should read --input--.

COLUMN 1

Line 10, "image" should read --an image--;
   Line 62, "including," should read --including a--;
   Line 63, "and," should read --and a--.

COLUMN 2

Line 33, "an" should be deleted;
   Line 35, "embodiment 3." should read --third embodiment.--;
   Line 41, "in" should be deleted.

COLUMN 3

Line 16, "In, in" should read --In--.

COLUMN 6

Line 8,  "execute" should read --executes--;
   Line 46, "by" should be deleted.

COLUMN 7

Line 65, "example, it" should read --example. It--.

UNITED STATES PATENT AND TRADEMARK OFFICE
CERTIFICATE OF CORRECTION

PATENT NO. : 5,604,539

DATED : February 18, 1997

INVENTORS : YOSHIMI OGASAWARA ET AL.

It is certified that error appears in the above-identified patent and that said Letters Patent is hereby corrected as shown below:

COLUMN 8

Line 30, "is strong for" should read --reduces--.

COLUMN 10

Line 50, "toggle" should read --toggles--;
   Line 52, "transmit" should read --transmits--.

COLUMN 12

Line 14, "ration" should read --ratio--.

Signed and Sealed this

Twenty-third Day of December, 1997

Attest:

BRUCE LEHMAN

Attesting Officer     Commissioner of Patents and Trademarks